Aug. 24, 1965  B. L. CORDRY  3,202,986
ANTENNA SWITCHING SYSTEM
Filed June 26, 1961  2 Sheets-Sheet 1
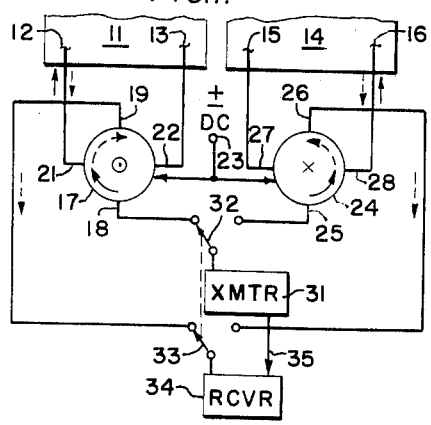
FIG.1.
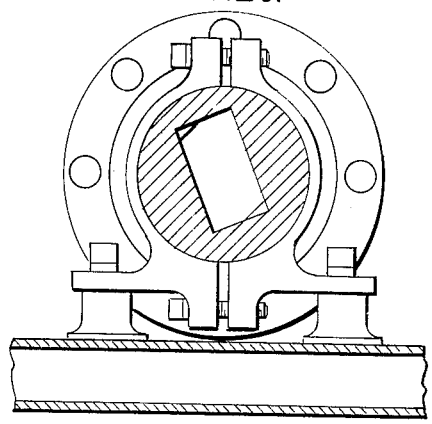
FIG.2c.
FIG.3.
FIG.2d.
INVENTOR.
BURTON L. CORDRY
BY
Killman, Smith & Lamb

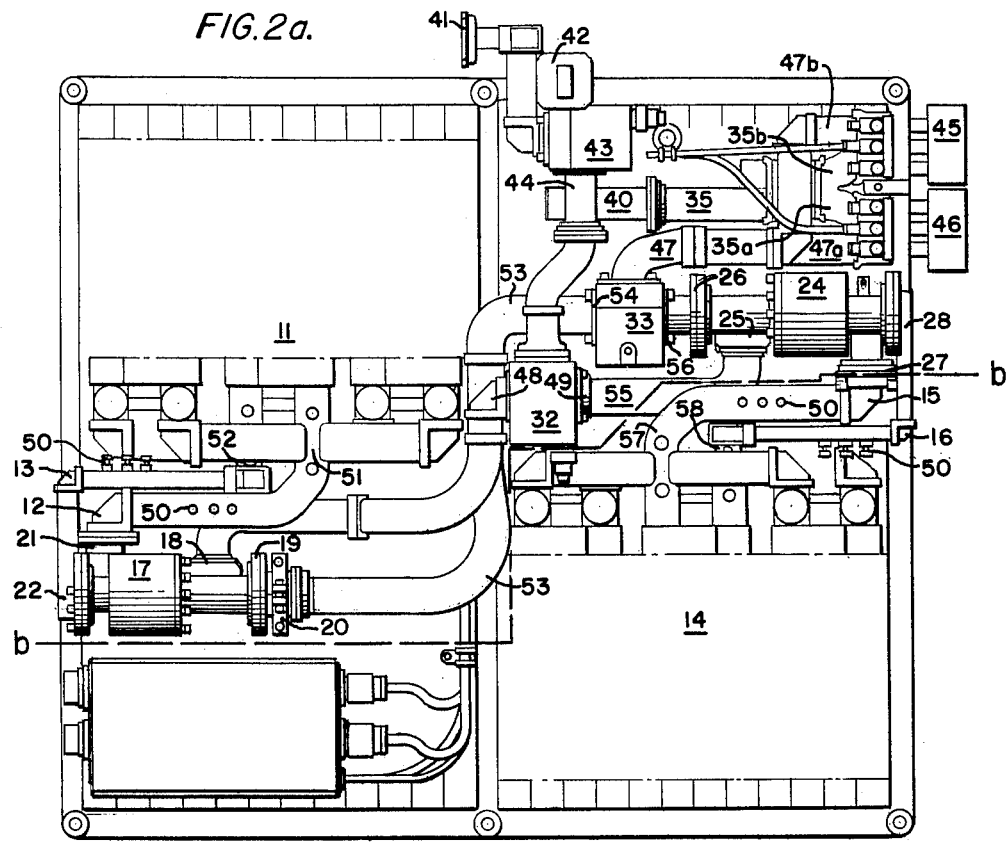
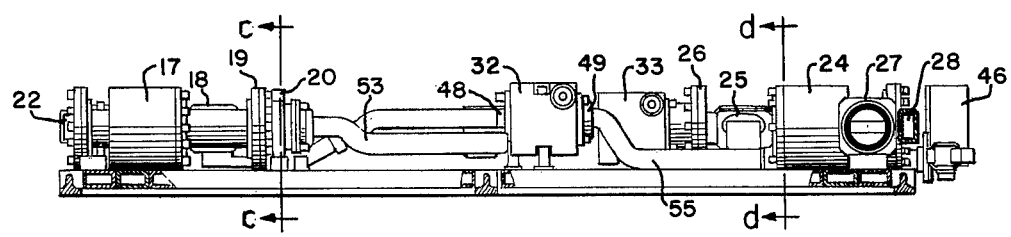

3,202,986
ANTENNA SWITCHING SYSTEM
Burton L. Cordry, Glen Arm, Md., assignor to The Bendix Corporation, Towson, Md., a corporation of Delaware
Filed June 26, 1961, Ser. No. 119,600
8 Claims. (Cl. 343—9)

This invention relates generally to improved antenna switching arrangements and in particular to an improved antenna system for Doppler navigation devices in which an antenna is mounted on an aircraft and employed to produce a plurality of sequentially positioned beams projecting at predetermined angles beneath the aircraft for the purpose of deriving navigational information.

This invention will be described as an improvement over the antenna and switching means disclosed and claimed in the co-pending application of Gunkel et al., Serial No. 845,034 assigned to the assignee of the present application. In the Gunkel et al. co-pending application a planar array of rectangular waveguides is arranged with slot radiators in the lower wall of the individual waveguides forming the array with a feed system for the waveguides providing a phase progression across the waveguide assembly which produces a beam in a predetermined direction. By reversing the phase progression the beam produced by the array extends in the opposite direction at an equal angle relative to a perpendicular center line from the planar array. By positioning two such planar arrays side-by-side and oppositely directed beneath an aircraft and switching energy between the two individual elements of the array, as well as switching the phase progression within the two half-elements of the array, it is possible to achieve four distinct beam positions such as a beam in each of the four quadrants defined relative to the center line of the aircraft and an axis transverse thereto. To obtain four beams so positioned the two halves of the planar array are generally considered the front and back arrays and the switching in either the front or back array produces a right or left direction to the beam so that the beam location either front or back and to the right or left of the aircraft may be obtained.

To obtain proper operation of the Doppler navigation system it is necessary to have a low standing wave ratio, since in a CW continuous wave system the energy return from reflections that are produced by discontinuities or other mismatches in the wave guide system is indistinguishable from the energy return from the ground and, hence, a system without an extremely good voltage standing wave ratio will suffer from poor isolation between the transmitter and the receiver and a higher noise figure. In the antenna disclosed in the previously mentioned co-pending application a number of tuning elements are provided for the purpose of tuning the antenna to obtain a substantially perfect match between the impedance of the antenna and the feed lines supplying energy thereto and directing the received energy therefrom. While this antenna operates satisfactorily as long as these adjustments are maintained, the procedure for obtaining adjustment is time-consuming, since many of the adjustments are interrelated and the procedure must be repeated to obtain the final high quality performance. Another disadvantage of the system is that in major overhaul the system is likely to get out of adjustment and the same time-consuming operation must be repeated. The structure of the antenna is such that tolerances in air frame and waveguide dimensions make mechanical fitting difficult and in view of the requirements for maintaining the precise adjustment the use of flexible waveguide was not feasible.

It is an object of the present invention to provide an improved waveguide antenna switching system in which elements are arranged so that the actual waveguide components which carry energy in both the transmitted and received direction are minimized thereby eliminating the effect of reflections in all components except those few which carry energy in both directions.

Another object is to provide an improved Doppler navigation system antenna with beam switching which minimizes the problem of mismatch in the microwave elements of the system.

A further object of the invention is to provide an improved arrangement of switching which permits a precise and simple adjustment to obtain a low-standing wave ratio in a complete antenna installation while maintaining an extremely low profile for the overall assembly.

A further object is to provide an improved Doppler aircraft antenna system capable of installation in an aircraft in a relatively simple fashion and which will maintain accurate operation without requiring frequent maintenance.

These and other objects of the invention will be apparent from the following detailed description taken in conjunction with the accompanying drawings wherein:

FIG. 1 is a schematic diagram of an improved antenna system in accordance with the invention;

FIGS. 2a and 2b are plan and elevation views respectively of a complete dual system antenna constructed in accordance with the invention;

FIG. 2c is a sectional view typical of either section C—C of FIGS. 2a and 2b;

FIG. 2d is a sectional view typical of either section D—D of FIGS. 2a and 2b; and FIG. 3 is a schematic diagram of an alternative embodiment of the invention.

Referring now to FIG. 1, a schematic disclosure of the invention provides an antenna array 11 having two input waveguide connections 12 and 13 with the antenna 11 arranged to produce a beam oppositely directed relative to a center line normal to the plane of the array when the inputs 12, 13 are alternately energized. A similar antenna 14 has inputs 15 and 16 for producing a beam on opposite sides of the center line for alternate energization of the waveguide couplings 15 and 16. The antennas 11 and 14 may be arranged to have the beams produced thereby oppositely directed to provide beams to the front or to the back of the aircraft. Thus if the antenna 11 produces beams forwardly directed, then energization of waveguide terminal 12 will produce the front-left beam and energization of the waveguide coupling 13 will produce the front-right beam. With antenna 14 producing beams rearwardly directed, energization of waveguide coupling 15 will produce the rear-left beam and energization of the waveguide coupling 16 will produce the rear-right beam.

The waveguide couplings 12 and 13 are energized from the outputs of a circulator 17. The circulator 17 is a non-reciprocal device having an input terminal 18 and an output terminal 19 which are electrically isolated from each other. In addition to the input and output terminals, the circulator 17 has two terminals 21, 22 which are switched between the input and output terminals 18 and 19. One form of circulator device 17 is a Faraday rotator operated by applying a magnetic field in opposite directions to a ferrite element in the rotator. As indicated in the rotator 17, a magnetic field is applied in the direction to emerge from the plane of the figure and under these conditions energy entering input terminal 18 passes out of output terminal 21 and returned energy entering terminal 21 passes out of output terminal 19. Upon reversal of the direction of the magnetic field, the energy applied to the input terminal 18 will pass to terminal 22 and energy returning from the waveguide coupling 13 into terminal 22 will pass to the output terminal 19. Thus the terminals 21 and 22 are switched, one or the other being energized depending upon the direction of the magnetic field applied to the circulator 17. This magnetic field may be controlled by a solenoid energized by a D.C. current from terminal 23 which current may be switched in polarity to change the polarity of the magnetic field produced in the circulator 17.

A second circulator 24 is provided having input terminal 25 and output terminal 26 with switched terminals 27 and 28 connected respectively to the waveguide couplings 15 and 16. As indicated, the circulator 24 has a magnetic field in the direction into the plane of the paper which is opposite to that of the circulator 17. Upon the reversal of the current applied to the terminal 23, both directions of magnetic field for circulators 17 and 24 will reverse. For the direction of field shown for the circulator 24 energy input to terminal 25 passes out of terminal 28 to waveguide coupling 16 and returned energy from the coupling 16 passes to output terminal 26. As described with respect to the circulator 17, this energy flow will be transferred to be with respect to the terminal 27 upon the reversal of the magnetic field from that shown for the circulator 24. It is, of course, not necessary that the circulators 17, 24 be oppositely poled but for convenience in a four-beam position system the beam switching is simplified if the circulators are oppositely poled as shown.

The inputs 18 and 25 of the circulators 17 and 24 are supplied from a transmitter 31 which is applied selectively through a switch 32 to either the input terminal 18 or the input terminal 25. The switch 32 may be a ferrite device operated by a magnetic field control and in particular may be a device of the type known as a ferrite T-circulator. While a ferrite switch of this type is preferred any suitable waveguide switch for performing the switching function indicated by the switch 32 will be satisfactory, including mechanical switches.

The output terminals 19 and 26 of the circulators 17 and 24 are applied through a switch 33 to a receiver 34 which also receives a small portion of the transmitted energy via line 35 to produce an IF signal. The switch 33 may be similar to the switch 32 and is ganged for operation therewith so that the transmitter and receiver are always connected to either the circulator 17 or the circulator 24 at the same time.

Referring now to FIGS. 2a, b, c and d, the improved waveguide feed and switching arrangement of the invention will be described in relation to the antenna array described in detail in the above-mentioned co-pending application. Only the changes in the feed system will be described in detail, reference being made to the co-pending application for a complete understanding of the remaining portions of the antenna. Those elements in FIGS. 2a and 2b which correspond to the elements described in FIG. 1 are designated by like reference numerals.

The antenna shown in FIG. 2a is for a dual system, as described in said co-pending application, which has two inputs 41 and 42 for connection to waveguides extending from the klystron oscillators in the respective transmitters of a dual system. Energy coupled to the flange couplings 41, 42 is switched by a waveguide switch 43 is response to the dual system operation depending upon which klystron is to transmit the energy to be used. The energy selected by the switch 43 is connected by a waveguide section 44 to the switch 32 which is a ferrite magnetically operated device such as the ferrite T-circulator previously described. It will be understood, however, that the switches 32 and 33 can be any type switch including mechanical switches.

A portion of the transmitted energy is tapped off by an attenuator waveguide section 40 to be supplied by waveguide 35 to respective mixers 45, 46 of the two receivers of a dual system. For this purpose the line 35 divides into two branches 35a and 35b. The received signals are supplied to the receivers from the switch 33, which is a ferrite magnetically controlled three-port switch, by means of a line 47 which also branches to supply the two mixers 45, 46 of a dual system, the branch lines being designated 47a and 47b.

The front-back ferrite switch 32 has switched output waveguide connections 48 and 49 with output 48 connected by a waveguide to the input terminal 18 of circulator 17 and the waveguide output 49 connected by a waveguide to the input 25 of the circulator 24. The entire waveguide run from the input flanges 41 and 42 to the inputs 18 and 25 of the circulators 17 and 24 including the portion of the path through the switches 43 and 32 carries only transmitter power in the direction from the transmitter through the waveguide to the circulators and, hence, reflections are of minor consequence and have no effect whatsoever on the receiver operation. Accordingly, the various connections can be made by flexible waveguide to facilitate installation and greatly simplify the construction and reduce the cost thereof.

The circulator 17 is magnetically controlled by a D.C. current generated magnetic field to switch the energy applied at input flange 18 between two outputs 21 and 22 which are connected to three-way power dividers 51 and 52, as described in the co-pending Gunkel et al. application. The transfer of the energy from the outputs 21 and 22 to the ultimate radiation from the slot array is in accordance with the description in the co-pending Gunkel et al. application reference being made to said description for an understanding thereof. In order to minimize reflections in the portion of the system coupled to waveguide outputs 21, 22 two sets of triple stub tuners 50 are used to match the system.

The circulator 17 receives energy from either line 21 or 22 depending upon which path is carrying transmitted energy, as determined by the D.C. field applied to the circulator 17. This echo signal energy passes out of the circulator 17 through waveguide output 19 due to the non-reciprocal action in the circulator. In the operation of the circulator 17 the energy experiences a 45° angular rotation in passing through the device in each direction. The transmitter energy coupled into input 18 at an angle of 45° as shown in FIG. 2d, is rotated 45° in one direction or the other depending on the polarity of the magnetic field applied thereto to be of the proper polarity to pass out of either waveguide 21 or 22 which are orthogonally coupled to the circulator 17. The returned echo signals will be rotated 45° in the same direction so that they will be decoupled (i.e. rotated 90°) from the waveguide connection 18 but be of the proper polarity to pass out of waveguide connection 19. A twist section 20 shown in section view in FIG. 2c may be employed to align the polarization of the energy emerging from the output 19 with that of waveguide 53.

The Doppler return energy from output 19 is connected by a waveguide 53 to an input 54 of the switch 33 where it may be selectively connected by operation of the switch 33 to the output 47. Since no transmitter power flows through waveguide 53, reflections are of relatively minor importance and a flexible waveguide section can be employed.

For the back antenna operation the switch 32 is switched to direct transmitter power from the input at flange 41 or 42 to an output 49 to which is connected a waveguide 55 to supply the power to the input 25 of the circulator 24. The circulator 24 operates in the manner described for the circulator 17 to switch transmitted energy between the output lines 27 or 28 and depending upon which line is energized Doppler echo signals will be returned over the same line to the circulator 24 and pass out of the output 26 to the receiver. The output from the connection 26 supplies the other input 56 of the switch 33 and is selectively supplied to the output 47 depending upon the switched condition of the switch 33 as controlled by the D.C. field operating on the ferrite element therein. The transmitted and received energy passing through waveguides 27 and 28 is supplied to three-way power dividers 57 or 58 and coupled to the radiating elements of the array in the manner described in the referenced co-pending application. Triple stub tuners 50 are also provided in these lines.

The operation of the antenna feed system shown in FIGS. 2a–d corresponds exactly to that described with reference to the schematic showing thereof in FIG. 1. As seen particularly in FIG. 2b the entire antenna and feed system can be constructed in a compact manner with the vertical depth of the antenna being no greater than that required for the relatively small components such as the circulators 17 and 24 and the switches 32, 33 and 43.

Referring now to FIG. 3, a modification of the invention showing the use of un-switched isolator devices will be described. While FIG. 3 shows the modification applied to select one of four inputs to an antenna system, the arrangement may be extended to provide switching among any number of inputs as required. As in FIG. 1 the antenna section 11 has inputs 12 and 13 while the antenna section 14 has inputs 15 and 16. In each instance the inputs 12, 13 and 15, 16 are supplied with transmitter power from a respective circulator 61. Each circulator 61 has a transmitter input connection 62, a receiver output 63, and a transmit-receive output 64 which supplies energy from the transmitter input 62 to the respective antenna input and received energy from the antenna to the receiver output 63.

In each case the circulator 61 may be a ferrite device permanently polarized by a magnet or a permanently energized solenoid since no switching function in the circulator is required. In this manner the circulators 61 may be optimized for isolation between the terminals 62 and 63 in order to minimize the feed-through of transmitter power to the receiver section.

To supply transmitter energy to the circulator 61 and to receive Doppler signal energy therefrom to supply the receiver a waveguide equivalent of a relay tree is employed for both the transmitter path and for the receiver path. The relay tree for the transmitter has a first tier front-back switch 65 which can be connected to either a terminal 65a or terminal 65b for selecting either the front antenna 11 or the back antenna 14 for transmission. Terminal 65a is connected to a second tier left-right switch 66 which can be selectively connected to a terminal 66a or 66b in order to energize either the left terminal 12 or the right terminal 13. The front-back transmitter switch 65 is ganged with a first tier receiver switch 71 which can be connected to either terminal 71a or 71b for selecting either the front antenna 11 or the back antenna 14 for reception. The left-right transmitter switch 66 is ganged with a second tier left-right receiver switch 67 which selectively connects with a left terminal 67a or a right terminal 67b. With the switches 65, 66, 67 and 71 in the positions shown in FIG. 3, transmitter energy from the transmitter 31 is radiated from the front-left direction as established by applying energy to the input terminal 12, and echo return energy is received on the same beam. The front-right beam would be obtained by switching switches 66 and 67 to the b terminals to energize antenna input 13. Similarly to obtain the back beams the switches 65 and 71 would be switched to their b terminals and corresponding back left-right switches 68 and 69 which are ganged together would be employed to obtain the left and the right beams. It will be understood that the switches indicated in FIG. 3 are microwave switches and preferably of the ferrite type magnetically controlled to produce fast switching with good isolation between the energized and unenergized ports of the equivalent single-pole double-throw switch. In certain applications as where the switching rate is low enough, mechanical waveguide switches can be used.

While a preferred form of circulator for the circulators 17 and 24 of FIG. 2 has been described as the type which employs the Faraday rotation effect under the control of a D.C. magnetic field the polarity of which can be switched, it will be apparent that other circulators can be used. Other devices can also be used which produce a four-port and its conventional function of alternating supplying transmitter power between two antenna connections while isolating the receiver output connection thereof and at the same time supplying returned energy at the antenna connections to the receiver output. As used in the appended claims the terms "four-port" is always a non-reciprocal device commonly known as a circulator or equivalent and a "three-port" is a switch of mechanical or electrical type and may be either reciprocal or non-reciprocal. These terms are to be interpreted as including structure capable of performing the functions as described herein.

From the foregoing description it will be apparent that the antenna feeds described provide signal travel in both directions only in those interconnections between the switch circulators 17 and 24 in FIGS. 1 and 2 and the radiating element assemblies or between the circulators 61 in FIG. 3 and the radiating element assemblies. All of the remaining waveguides in the system are carrying energy in one direction only so that the standing wave ratio in this portion of the feed is of no consequence as long as it is reasonably good in accordance with standard practice. It is hence possible to eliminate all tuning adjustments except those immediately concerned with the radiating elements where two-way power transmission occurs. For this purpose triple stub tuners and adjustable plungers are provided as described in the above-mentioned co-pending application. The tuning procedure can be greatly simplified, however, and the use of flexible waveguides in any of the one-way transmission paths makes the system easier to install since air frame and waveguide parts tolerances can be accommodated. The use of flexible waveguide is possible since variations in the standing wave ratio within broad limits have no consequence in system operation which was not the case where a major portion of the system carried transmitter power as well as received power and reflections within the guide were indistinguishable from signal returns, or appeared as an unbalancing leakage term in the balanced microwave mixer.

While the particular application of the invention to a particular aircraft antenna system has been described, it will be understood that the invention is not limited to this particular antenna but may be applied to various configurations employing equivalent switching elements without departing from the spirit and scope of the invention. The invention, accordingly, is to be limited only by the scope of the appended claims.

I claim:

1. An antenna system for producing a microwave beam switchable between alternate positions comprising a fixed planar array having two waveguide terminals coupled to provide said beam at said alternate positions respectively, a four-port circulator device having an input port and two output ports for switching energy flow from said input port to a selected one of said two output ports and reverse energy flow from the selected one of said two output ports to a third output port, individual connections between said waveguide terminals and said two outputs, means for coupling transmitter energy to said input port, a receiver coupled to said third output port and means for matching the portion of said system between said two circulator output ports and said array.

2. An antenna system for producing an antenna beam selectively directed to one of four positions comprising antenna means having four waveguide terminals individually energized to produce said four beams, a pair of four-port circulators each having an isolated input and an output concurrently switchable between a pair of said terminals, a first three-port switch having an input terminal switchable between the inputs of said circulators, a second three-port switch having an output terminal switchable between the outputs of said circulators, a microwave source coupled to said input terminal of said first three-port switch, a microwave receiver coupled to said output terminal of said second three-port switch, means for switching said three-port switches in unison to connect said source and said receiver to the same circulator, and means for switching said circulators to connect said source and said receiver to a particular one of said four waveguide terminals.

3. Apparatus according to claim 2 and including tuning means for matching the impedance of said antenna means at said four waveguide terminals.

4. A Doppler navigation system for a vehicle comprising an antenna array fixed relative to said vehicle, four waveguide couplings for individually energizing said array to produce four distinct beam positions extending at predetermined angles from said vehicle, a microwave transmitter, a pair of four-port circulators each having an isolated input and output switchable between the remaining pair of terminals of the four-port, a first microwave switch operable alternately to couple said transmitter to said inputs of said pair of circulators, a microwave receiver, a second microwave switch operable alternately to couple said receiver to said outputs of said pair of circulators, coupling connections between the remaining pairs of terminals of both of said circulators and said four waveguide couplings respectively, means for switching said first and second switches in unison to connect said transmitter and said receiver to the same circulator, and means for switching said circulators.

5. Apparatus according to claim 4 in which said array is a planar array of a plurality of parallel waveguides having slot radiators in the lower wall thereof and said circulators are mounted directly above said plurality of waveguides.

6. Apparatus according to claim 5 adapted for dual system operation by including a second microwave transmitter, a third microwave switch operable to connect said transmitters alternately to said first microwave switch.

7. A microwave antenna switchable to position a beam at any one of a plurality of positions comprising antenna means having a plurality of antenna inputs each respectively energizable to produce said positions of said beam, a transmitter microwave input connection, a receiver microwave output connection, a circulator connected to each of said antenna inputs and providing an isolated transmitter and receiver terminal for each of said antenna inputs, a transmitter microwave switch-tree connected between said transmitter microwave input connection and all of said isolated transmitter terminals, a receiver microwave switch-tree connected between said receiver output connection and all of said isolated receiver terminals and means for gang switching corresponding switches in the same tier in both said transmitter and receiver trees for uniquely selecting one of said antenna inputs for simultaneous transmission and reception.

8. A microwave antenna system having a plurality of microwave terminals individually energizable to produce a microwave beam, comprising a plurality of nonreciprocal microwave transmission elements each connected to one of said terminals for directing transmitted energy from an input on said transmission element to said one microwave terminal and directing received energy from said one microwave terminal to an output on said transmission element, a microwave transmitter and a microwave receiver, microwave transmission lines joining said transmitter with said transmission element inputs and said receiver with said transmission element outputs, and microwave switch means in said lines for uniquely selecting any one of said elements to couple said input and output thereof to said transmitter and receiver respectively.

References Cited by the Examiner
UNITED STATES PATENTS

| | | | |
|---|---|---|---|
| 2,832,054 | 4/58 | Fox | 33—11 X |
| 2,867,772 | 1/59 | Allen | 333—11 X |
| 2,981,944 | 4/61 | Washburn | 343—9 |
| 2,994,875 | 8/61 | Stavis | 343—9 |
| 3,013,262 | 12/61 | Tollefson | 343—9 |
| 3,032,758 | 5/62 | Stavis | 343—9 |
| 3,083,362 | 3/63 | Stavis | 343—9 |

CHESTER L. JUSTUS, *Primary Examiner.*

KATHLEEN CLAFFY, *Examiner.*